United States Patent [19]

Houghton

[11] Patent Number: 4,508,687
[45] Date of Patent: Apr. 2, 1985

[54] DEGASSING/BRINE TANK FOR POOL CHLORINATING SYSTEM

[76] Inventor: Richard W. Houghton, 344 Elm St., East Longmeadow, Mass. 01028

[21] Appl. No.: 505,928

[22] Filed: Jun. 20, 1983

[51] Int. Cl.$^3$ .................................................. B01D 15/00
[52] U.S. Cl. ...................................... 422/276; 204/95; 210/169; 210/188; 210/192; 422/274; 422/278; 422/279; 422/902
[58] Field of Search ............... 210/169, 188, 190, 191, 210/192, 750, 198.1, 205; 423/658.5; 422/274, 422/276, 277, 264, 275, 278, 279, 982; 204/95

[56] References Cited

U.S. PATENT DOCUMENTS

| | | | |
|---|---|---|---|
| 2,758,070 | 8/1956 | Yurko | 422/278 |
| 3,307,914 | 3/1967 | Heiss et al. | 422/274 |
| 4,294,676 | 10/1981 | Boutin et al. | 422/275 |

FOREIGN PATENT DOCUMENTS 2820818 11/1979 Fed. Rep. of Germany ...... 210/192

*Primary Examiner*—Barry S. Richman
*Assistant Examiner*—John Donofrio
*Attorney, Agent, or Firm*—Chapin, Neal & Dempsey

[57] ABSTRACT

A degassing/brine tank, for use in a chlorine generator system for swimming pools, for providing a fresh saturated brine solution continuously to the electrolytic chlorine generator cells of the system and to minimize escape of chlorine gas circulating in the system. The tank, fabricated of synthetic plastic material, has a plurality of vertically separated chambers, including, at its lower end, coaxially arranged inner and outer brine pick-up chambers. The outer annular chamber, open at its lower end, communicates with a salt and water reservoir within which the tank is immersed and a filtered supply of the brine is received by the inner, lower chamber. A check valve coupled to this inner chamber controls the supply of the brine solution into a helical coil by which the saturated brine solution is furnished to the electrolytic chlorine cells. At the top of the tank, the upper chamber is connected by a conduit to a dewatering device of the chlorine generator and heavily chlorinated brine is recycled to the tank through this conduit. The next lower chamber communicates with the upper chamber to permit both the upward escape of chlorine gas and the downward gravity flow of recirculated brine from the dewatering device. An intermediate, mixing chamber receives the recirculated brine from the next upper chamber and a tangentially extending conduit feeds the recycled brine into the fresh brine flowing within the helical coil.

9 Claims, 5 Drawing Figures

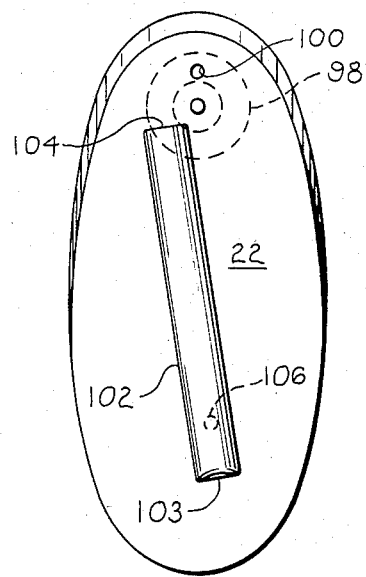
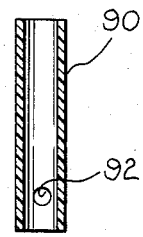
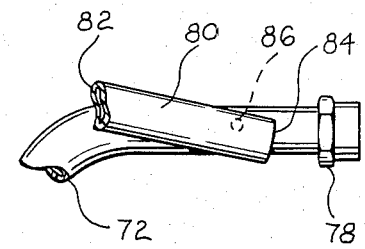
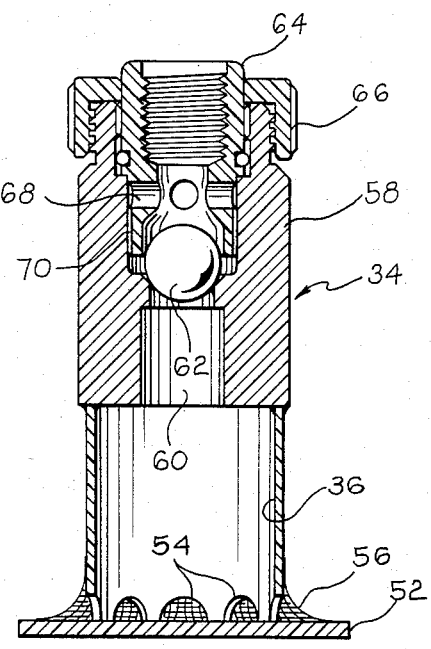

DEGASSING/BRINE TANK FOR POOL CHLORINATING SYSTEM

BACKGROUND OF THE INVENTION

This invention relates to chlorine generator systems for swimming pools of the closed cell type and more particularly to a degassing/brine tank used to provide a continuous supply of fresh brine solution to the electrolytic cells of the chlorine generator and to degassify the chlorinated brine which is recycled from the dewatering device of the system. The degassing tank includes a plurality of vertically separated but interconnecting chambers to contain chlorine gas which is liberated from the recycled brine. Degassified/brine is thereafter mixed with fresh brine supplied to the lower chamber of the tank and introduced into a helical coil. Mixing of the recycled brine and fresh brine is accomplished within the coil at its upper end at a point adjacent the passage of the coil through the tank wall for connection to the electrolytic cells.

In prior chlorine generating systems for swimming pools, the systems were "open" and when chlorine is piped to the pool from the dewatering device, the bottom orifice of the device merely drained the remaining heavily chlorinated liquid into the bottom of a combination of generator tank and electrolytic cell where it simply effused into the tank liquid. The bottom end of this tank included a brine pick-up in the form of an open slit screen cone and when the chlorine gas effused as a result of cell-back surging, chlorine would spread throughout the tank and its environment. This resulted in the evolution of chlorine fumes which were irritating and sometimes overpowering to service personnel. In addition, the chlorine gas tended to roil the salt supply in the reservoir and as a result, salt crystals were frequently picked up by the slit screen cone. Furthermore, the brine solution tended to be highly caustic and irritating to the skin. In addition, in those communities where the water supply contains iron, the result was the formation with oxygen of ferric chlorides which discolored tank components and generally created an unsightly mess.

One of the major disadvantages of the so-called open system was the roiling of the salt and water in the supply tank which made it difficult to observe visually the salt level in the tank.

It is the principal object of this invention to provide an improved chlorine generator system for swimming pools which overcomes the drawbacks of the systems heretofore available.

Another object of this invention is to provide a degassing/brine tank for a closed chlorine generator system.

A further object of this invention is to provide a degassing/brine tank of the above-type in which a fresh supply of a saturated solution of brine is continuously generated and mixed with recycled chlorinated liquid which is simultaneously returned from the dewatering device of the system and degassified within the tank.

Yet a further object of this invention, is to provide a degassifying/brine tank for a pool chlorinator in which the problems of chlorine gas excaping from the system and the induction of salt crystals into the brine supply are avoided. The above and other objects and advantage of this invention will be more readily apparent from the following description read in conjunction with the following drawings, in which:

FIG. 2 is a bottom plan view of a part of the tank depicted in FIG. 3;

FIG. 3 is a cross-section elevational view of a tubular conduit shown in FIG. 1;

FIG. 4 is a partial elevational view of a portion of the tank of FIG. 1, and

FIG. 5 is a cross-sectional view, on an enlarged scale, showing in detail the valve means, illustrated in FIG. 1.

Figure 1:
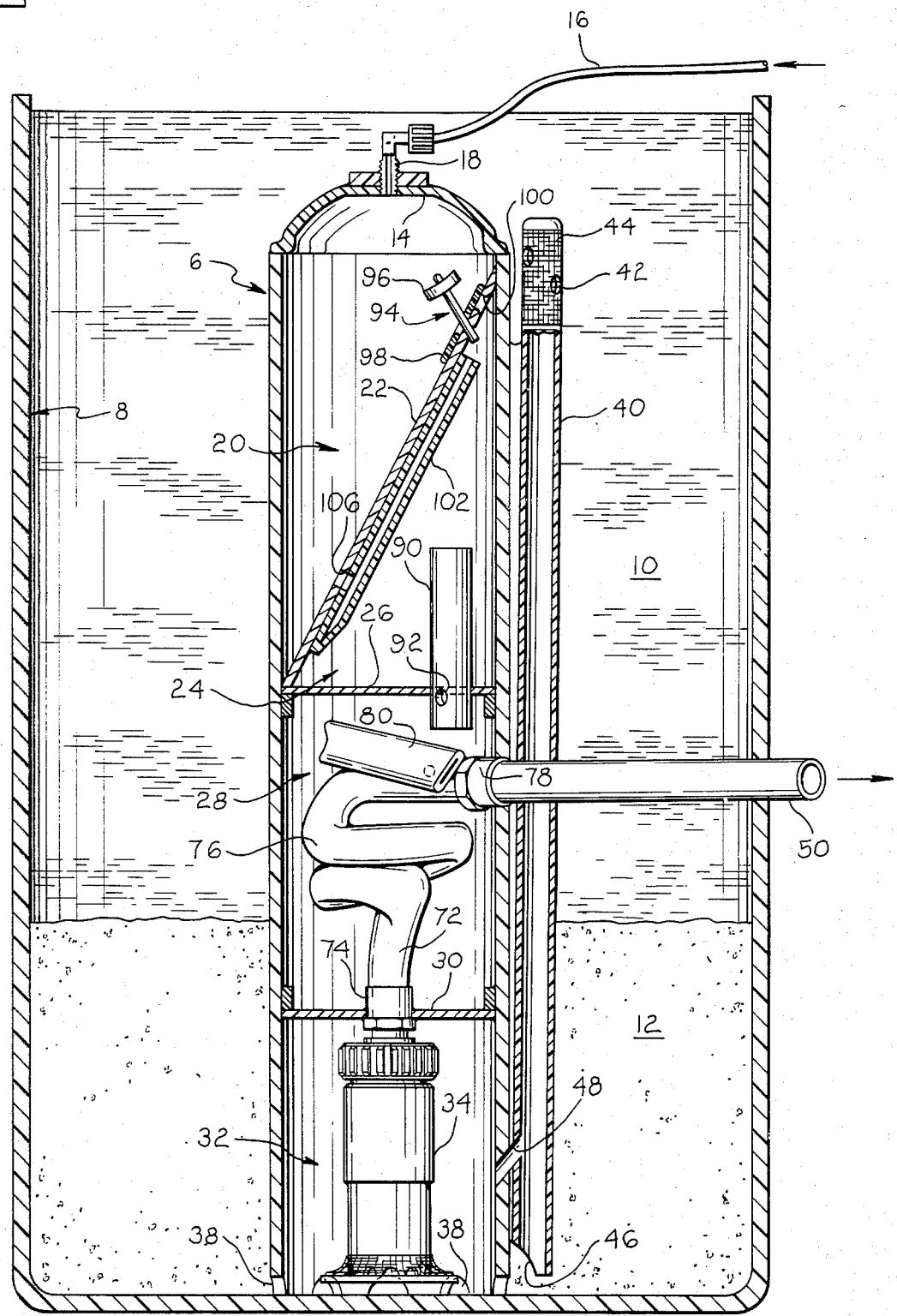
FIG. 1 is an elevational view, partly in section, showing a degassifying/brine tank of the type embodying my invention.

Referring in detail to the drawings in FIG. 1, is shown a degassing/brine tank 6. The tank is disposed within an outer receptacle or tank 8 of larger cross-section which, as illustrated, is filled with a supply of water 10. The bottom of the larger tank 8 has a supply of crystalline salt 12, chemically NaCl. The inner tank is of cylindical cross-section and is preferably disposed at the center of the outer tank 8 so that the salt supply 12 uniformly surrounds the lower end portion of the tank 6. The water may be continuously piped into the outer tank and maintained at a constant level above the top of the tank by a simple float control valve, not shown. The water level provides a suitable head of pressure for proper operation of the tank 6. It will be a simple matter to maintain an adequate supply of ordinary salt, NaCl, in the outer tank 8 by an occasional visual inspection.

The tank 6 includes a dome-like top closure or cap 14 and a tube 16, connected to a threaded fitting 18 which extends through the center of the cap 14, and provides for the return of chlorine containing liquid from a dewatering device. This recycled liquid is usually heavily chlorinated water and quite caustic in nature.

The entire tank 6 is preferably fabricated of a suitable, corrosion resistant, synthetic plastic material and is of cylindrical cross-section with a plurality of vertically stacked chambers. The top or uppermost chamber 20 is defined by the upper portion of the tank, including dome 14 and an obliquely extending partition or transverse wall 22. The next lower chamber 24, below chamber 20, is defined at its upper end by the partition 22, the surrounding wall portion of the tank 6 and a transverse wall 26 perpendicular to the vertical axis of the tank 6. The next lower chamber 28 is defined by wall 26, the surrounded wall portion of tank 6 and transverse wall 30 also perpendicular to the axis of the tank. The bottom of the tank is open and its lower chamber 32 defined by transverse wall 30, the surrounding wall portion of tank 6 and the bottom portion of outer tank 8, upon which the lower end of the tank 6 rests.

Within the lower chamber 32 of tank 6, is a valve member 34 which includes at its lower end, an inner chamber 36 (FIG. 5) coaxial within the surrounding annular chamber 32. The lower edge of the tank 6 is scalloped by means of a plurality of circumferentially spaced, semi-circular openings or cutouts 38. These cutouts provide for communication between the lower end of chamber 32 and the surrounding salt supply 12.

A vertically oriented, water supply pipe 40 is disposed on the outer surface of tank 6, and entends from a point adjacent the top of the tank and terminates at a point adjacent the upper edges of cutouts 38. The upper end of the pipe includes a plurality of orifices or holes 42 and a screen or sieve 44 is disposed over these orifices to prevent any large particulate matter entering the pipe 40. The lower end of the pipe has an oblique opening, as at 46, facing toward the adjacent cutouts 38. The pipe also includes a port 48, which provides fluid communication from the pipe 40 to a point within chamber 32, approximaterly midway of its height. Thus, water entering the pipe 40, at its upper end, will flow downwardly an enter the lower chamber 32 through the port 48 without dissolving salt and through the bottom cutouts 38 where the water will contact and dissolve salt adjacent the lower end of the tank. The water from port 48 and a brine solution which flows through cutouts 38 will fill the lower chamber 32 due to the static head of pressure of the water reservoir 10. The pressure head of the water level maintained in the outer tank will be sufficient to cause the upper chambers of tank 6 to be filled. In addition, the electrolytic cells operate in a two-phase cycle; one is a gas expansion phase peaking with the positive pressure of gas expansion followed by a pressure reduction as the gas escapes from the electrolytic cell. With each reduction in pressure, brine solution in chamber 32 will be induced into inner lower chamber 36 (FIG. 5) and then through valve 34.

As best illustrated in FIG. 5, the valve member 34, preferably formed of corrosion resistant plastic material, comprises the lower cylindrical chamber 36 having a transverse baffle plate 52 disposed across the lower end of the chamber. As shown in FIG. 1, this baffle plate is disposed in closely spaced relation above the bottom of tank 8. As illustrated, the baffle is preferably located approximately at the same height as the top surface of the arcuate cutouts 38. The lower end of the wall defining chamber 36 is also of scalloped construction similar to the bottom of the tank 6, but the semicircular cutouts 54 are substantially smaller than cutouts 38. A sieve or screen 56 is disposed around the openings 54 to filter out any large particles, including agglomerates of salt crystals.

The valve 34 (FIG. 5) includes a sleeve portion 58 having an axial bore 60 therethrough with a valve seat for a free floating synthetic plastic ball 62. A tubular fitting 64 is fitted within the outer sleeve 58 and a nut 66 clamps the assembly together. A pair of transversely extending ports 68 cooperate with longitudinal grooves 70 to permit flow of liquid upwardly through the valve when the ball 62 is unseated. Liquid flow through the valve is received within a tubular coil 72 which leads the brine solution upwardly to outlet pipe 50 which extends through the wall portion of chamber 28 and may have a slight downward pitch for gravity-aided flow of the solution to the electrolytic cells.

Other than a central hole for tube coupling 74, the partition 30 is imperforate and provides for complete separation of the nascent brine solution in chamber 32 and the recycled liquid and brine in chamber 28, surrounding coil 72.

The coil 72 extends axially upward along the centerline of tank 6 for a distance of a few inches and then includes helically coiled intermediate portion 76, having a height of only about 6 inches, but an overall length of about 2 feet, and, finally, a radially extending upper leg portion which is adapted to be connected to the outlet pipe 50 which leads to the gas forming electrolytic cells of the system (not shown).

At a point closely adjacent the tank wall fitting 78, a tubular member 80 of generally rectangular cross-section is affixed to the radially extending upper leg portion of the brine coil tube 72. This tubular member is open at its outer end 82 (FIG. 4) and closed at its inner end 84. The inner surface of the tube 80 includes a small hole 86 which is aligned with a corresponding hole provided through the wall of coil 72. The inner end portion of tube 80 thus communicates with the interior of coil tube 72 and, in effect, the tube 80 serves as a "mixing well" to blend the recycled liquid from the surrounding chamber 28 with the brine solution flowing within the coil 72. As will hereafter be described, at this level in the tank 6, much of the chlorine gas has been liberated from the recycled liquid and a benign solution of saturated brine is continuously supplied to the electrolytic cells so long as the supply of water and crystalline salt in the outer tank are maintained at adequate levels.

Liquid in chamber 28, surrounding brine coil 72, is received successively from the two upper chambers 20 and 24. From chamber 24 to the upper end of chamber 28, a short tube 90 of generally rectangular cross-section extends through the partition 26. The tube 90 is open at both ends and includes a gas escape orifice 92 disposed closely adjacent the under surface of wall 26 so that any chlorine gas which rises toward this surface will necessarily be vented through tube 90, known as a "chamber exchange tube". The upper end of tube 90 opens into the chamber 24 at about mid-height of the chamber 24 so that liquid will only drain from chamber 24 when it rises above the upper end of tube 90.

The inclined partition or wall 22, which divides the upper end portion of the tank into chambers 20 and 24, includes a gas escape valve 94 of synthetic plastic construction. The valve, as best shown in FIG. 1, includes an upwardly extending stud or post disposed at an angle of about 60· degrees relative to the plane of the partition. An enlarged nut or cap 96 is disposed adjacent the outer end of the post. A centrally apertured disc or washer 98 is fitted onto the stud and is freely movable thereon toward and away from the upper surface of the diagonal wall 22. A port 100, which is radially offset from the post, is provided through the partition 22 at a point which will be sealed by the annular portion of the washer 98. The washer, as are all other parts of this valve, is formed of a light-weight plastic material whereby chlorine gas escaping from the liquid in chamber 24 will raise or lift the washer 98 to permit escape of the gas into top chamber 20 from which it can escape from the tank through tube 16 for return to the dewatering device of the system (not shown). When there are no gas bubbles rising from chamber 24, the washer will remain seated in its FIG. 1 position, closing off port 100. The valve 94 thus serves as a "flutter valve" for the controlled escape of chlorine gas from the upper end of chamber 24.

On the underside of the partition 22 is a tube 102 (FIGS. 1 and 2) of generally rectangular cross-section. This tube, known as a "rise tube", has a closed end 103 adjacent the lower end of partition 22 and an open end 104 adjacent the upper end of the partition 22. Adjacent the lower end of the tube is a hole 106 which extends through the tube wall and the abutting portion of partition 22, whereby communication is provided for the gravity flow of liquid from chamber 20 through hole 106 into tube 102 up the tube to its open end 104 and then into the upper end of chamber 24. Liquid will thus flow only from the lower level of chamber 20, but when the chamber is almost full.

In operation of this closed system, the tank 8 is first filled with water and common salt, as shown in FIG. 1. As a result of the static pressure of the water in tank 8, the chambers of the inner tank 6 are successively filled with brine. Chlorine gas generated by the electrolytic cells and liquid therefrom are conducted to a dewatering device from which the gas is introduced into the pool water by a chlorinator device. At the same time, a saturated brine solution is supplied to the cells by pipe 50 which is the output conduit of the degassing/brine tank 6.

From the dewatering device, located at a level above the level of the water in tank 8, chlorinated liquid is recycled to the top of tank 6 by tube 16 and this liquid, which has a higher specific gravity than the brine, will flow into chamber 20 until its level rises above the height of the open end of the rise tube 102. The liquid in chamber 20 will urge the flutter valve washer 98 to its closed position over gas escape port 100. The recycled liquid may then flow by gravity from chamber 20 through port 106, up rise tube 102 and from its upper end into chamber 24.

The recycled liquid will thereafter rise in chamber 24 until it exceeds the height of the upper end of exchange tube 90. As recycled liquid flows through tube 90 it will enter the top of the intermediate chamber 28 and continue to rise in chamber 28 therein until its level reaches the open end of tangentially extending mixing well 80, whereupon the recycled liquid will be induced into the upper, outer end portion of coil tube 72 by the variable pressure of the electrolytic cells. As the recycled liquid flows by gravity from chamber-to-chamber along a rather tortuous path, chlorine gas entrained in the liquid will be given off and will rise to the top of each chamber where it will escape through the escape vents provided therefor. From the intermediate chamber 28 gas escape will occur through hole 92 and tube 90. From chamber 24, rising gas can escape through flutter valve 94 and may then return to the dewatering device through tube 16.

Simultaneously, with the recycling of the chlorinated liquid from the top of the tank to successively lower chambers, a fresh supply of brine, of lower specific gravity, will be generated at the bottom of the tank by water flowing downwardly through supply pipe 40. As the electrolytic cells operate, a reduced pressure will be "seen" by outlet pipe 50 which is connected to these cells and this reduced pressure is communicated by coil tube 72 to the ball check valve 34 which senses the pressure differential on its upper and lower surfaces. As a result, a concentrated brine solution enters the tank through semi-circular ports 38 and mixes with water, which enters through port 48 to fill annular chamber 32. The brine solution is drawn into inner chamber 36 through sieve 56 and ports 54 and when the ball 62 of the check valve 34 is subjected to a higher differential pressure on its lower surface, the liquid will lift the ball from its seat and brine will flow through the coil tube 72 toward outlet pipe 50. As the brine flows within the tube coil 72 past the well-coil orifice 86, recycled liquid in the surrounding intermediate chamber 28 will be fed into the upper leg portion of tube 72 where it is blended with the fresh brine supply rising within the tube 72.

It will thus be recognized that the unitary tank 6 functions simultaneously and continuously to provide an upwardly rising supply of fresh brine for blending with downwardly settling recycled liquid which is degassified in its downward gravity flow from chamber-to-chamber within the tank. The chlorine generating system of my invention comprises an enclosed loop which prevents the escape of gas to the surrounding atmosphere, while providing a continuous supply of brine to the electrolytic cells for the generation of chlorine.

Having thus disclosed my invention, what is claimed is:

1. Degassing/brine tank for a pool chlorinator system including two upper and two lower chambers separated by an intermediate chamber having a coil tube therein, said tank including liquid flow passages for the gravity flow of liquid from the top of said tank successively from the first to the second of said upper chambers and then into said intermediate chamber, said tank also including means for conducting liquid successively upward from the first to the second of said lower chambers and then into said coil tube, said intermediate and upper chambers each including gas escape openings therethrough, and a mixing well in said intermediate chamber for combining liquid surrounding said coil with the liquid flowing within the coil, said coil including a radially extending upper leg portion adapted to extend through the side wall of said tank.

2. Degassing/brine tank for use in a pool chlorinating system having electrolytic cells which generate chlorine gas from brine, a saturated aqueous solution of sodium chloride, the chlorine gas is supplied to the pool water and chlorinated liquid is recycled to the tank, said tank, adapted to be disposed in a substantially larger outer receptacle, comprising a plurality of vertically separate chambers defined in part by imperforate, transverse partitions within the tank, the top chamber of said tank including a recycling conduit connected to receive said recycled liquid and the bottom chamber of said tank being open for receiving said brine therein from a supply of sodium chloride crystals surrounding the lower end portion of the tank and water contained in an outer receptacle, conduit means for the gravity flow of said recycled liquid from the top chamber of the tank into an intermediate chamber thereof, means for conducting brine upwardly from the bottom chamber of said tank into said intermediate chamber and means within said intermediate chamber for blending recycled liquid and said brine and supplying the blend to electrolytic cells for generating chlorine gas, said bottom chamber housing a check valve for controlling the flow of said brine therethrough, a tubular coil disposed to receive the flow of brine through said valve and to conduct the same from the bottom chamber to a higher level within the intermediate chamber, an opening in the partition between the top chamber and said intermediate chamber for the gravity flow of the recycled liquid into said intermediate chamber surrounding said coil and means interconnecting the recycled liquid within the intermediate chamber and the brine within said coil for blending the same and an outlet tube extending radially from the upper end of said tubular coil for supplying the blend to said electrolytic cells.

3. Degassing/brine tank as set forth in claim 1 and including an upright water supply pipe disposed on the outer surface of said tank for conducting water from an upper level of said outer receptacle to a point adjacent the bottom edge of said tank which includes a plurality of circumferentially spaced openings providing fluid communication between the surrounding receptacle and the interior of the bottom chamber of said tank.

4. Degassing/brine tank as set forth in claim 3 in which the top chamber of said tank is divided by a diagonal partition into an upper top chamber and a lower top chamber, said partition including an opening therethrough adjacent its lower end for the flow of liquid from the upper to the lower top chamber and a gas escape port through said diagonal partition adjacent the upper end thereof, and a conduit extending from the lower top chamber into said intermediate chamber for the gravity flow of said recycled liquid and a gas escape port through said conduit at a level adjacent the partition dividing the lower top chamber and said intermediate chamber.

5. Degassing/brine tank as set forth in claim 4 in which the means for blending the recycled liquid with the brine flowing within the tubular coil comprises a relatively short length of a tubular conduit open at its outer end and disposed tangentially to an upper radially extending leg portion of said tubular coil, said conduit having a hole therethrough communicating with a hole through the wall of the tubular coil at a point adjacent its connection to said radially extending outlet tube.

6. Degassing/brine tank as set forth in claim 5 in which the bottom chamber includes an annular portion disposed about an inner chamber, said inner chamber having a transversely disposed baffle plate at its lower end and a plurality of circumferentially spaced openings providing communication between the bottom of said inner chamber and the annular portion of said bottom chamber.

7. Degassing/brine tank as set forth in claim 6 in which said diagonal partition includes a tube disposed on its undersurface which extends from a point adjacent the lower end of said diagonal partition to a point adjacent its upper end, the tube on said partition having an opening at its upper end for liquid flow into the lower top chamber and including at its lower end an opening communicating with the upper top chamber for the gravity flow of liquid therefrom.

8. Degassing/brine tank as set forth in claim 7 in which said means for the gravity flow of liquid from the top chamber to the intermediate chamber comprises a length of pipe extending through the transverse partition separating the two chambers, said pipe extending upwardly a substantial distance from said partition, and a gas escape hole through the wall of said pipe adjacent the underside of said partition.

9. Degassing/brine tank as set forth in claim 8 in which a flutter valve is disposed to control the escape of gas upwardly through said diagonal partition, said flutter valve comprising a hole through said partition adjacent its upper end and a synthetic plastic washer movably mounted to selectively close and open said hole.

* * * * *